United States Patent Office 3,145,742
Patented Aug. 25, 1964

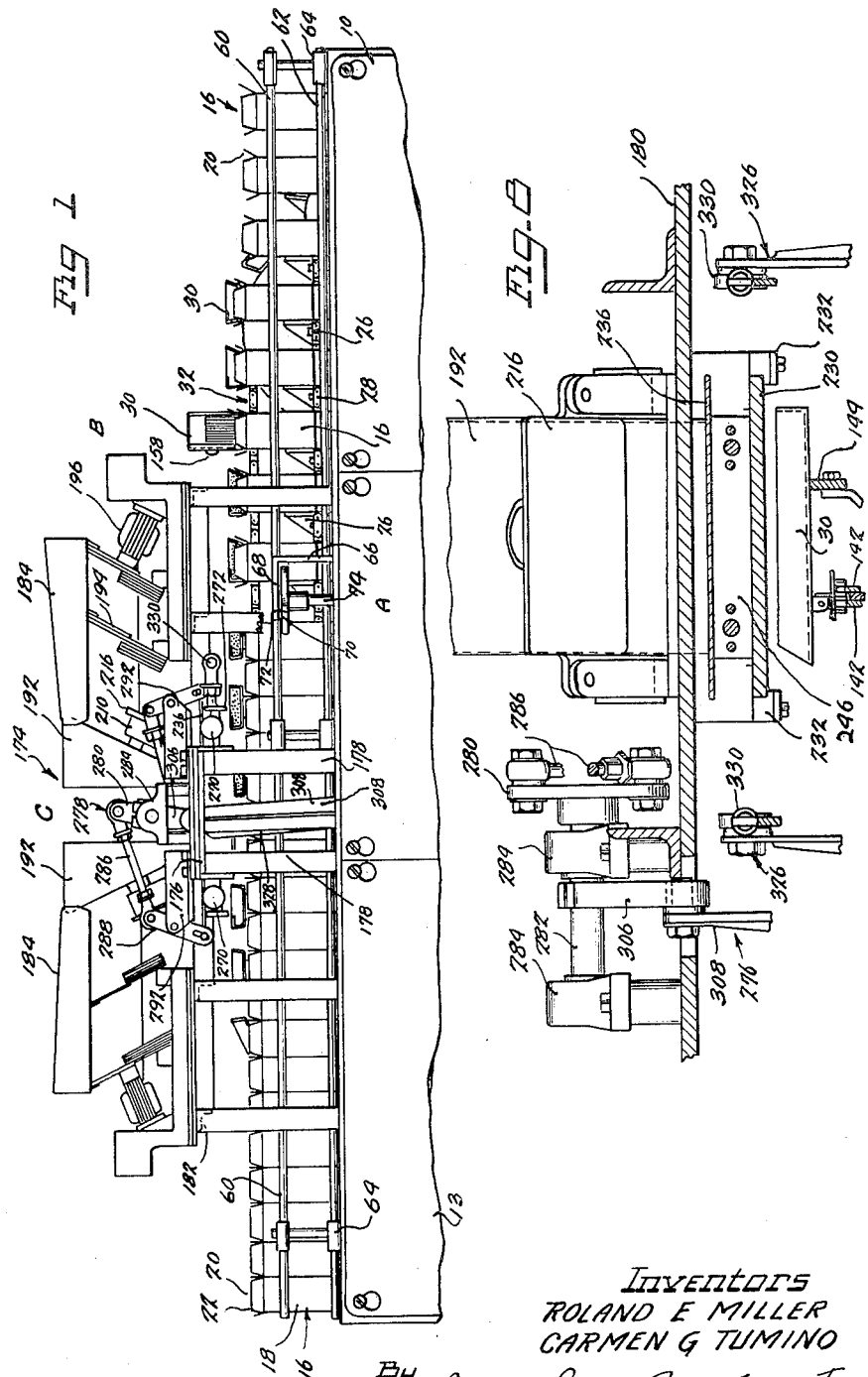

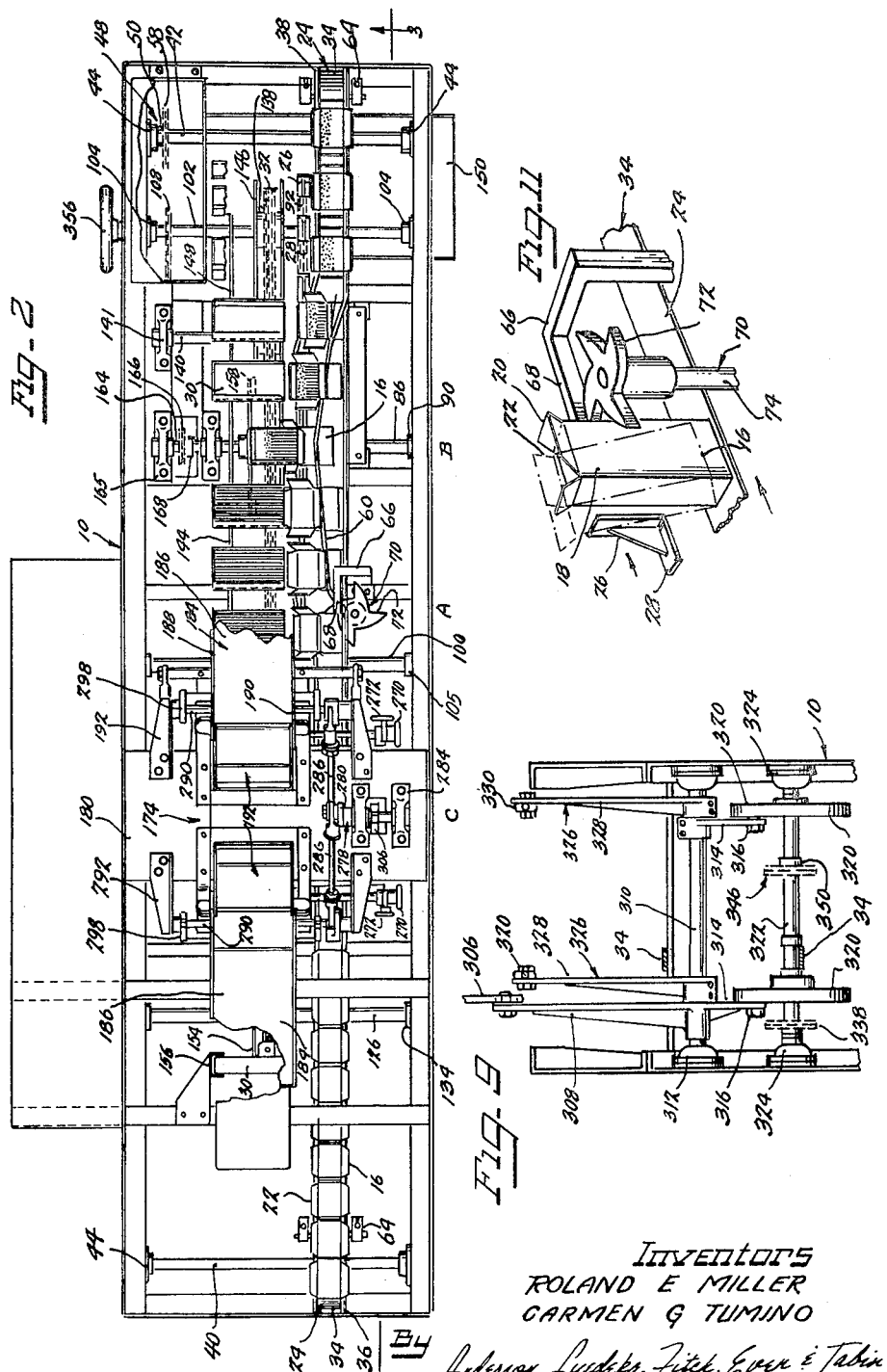

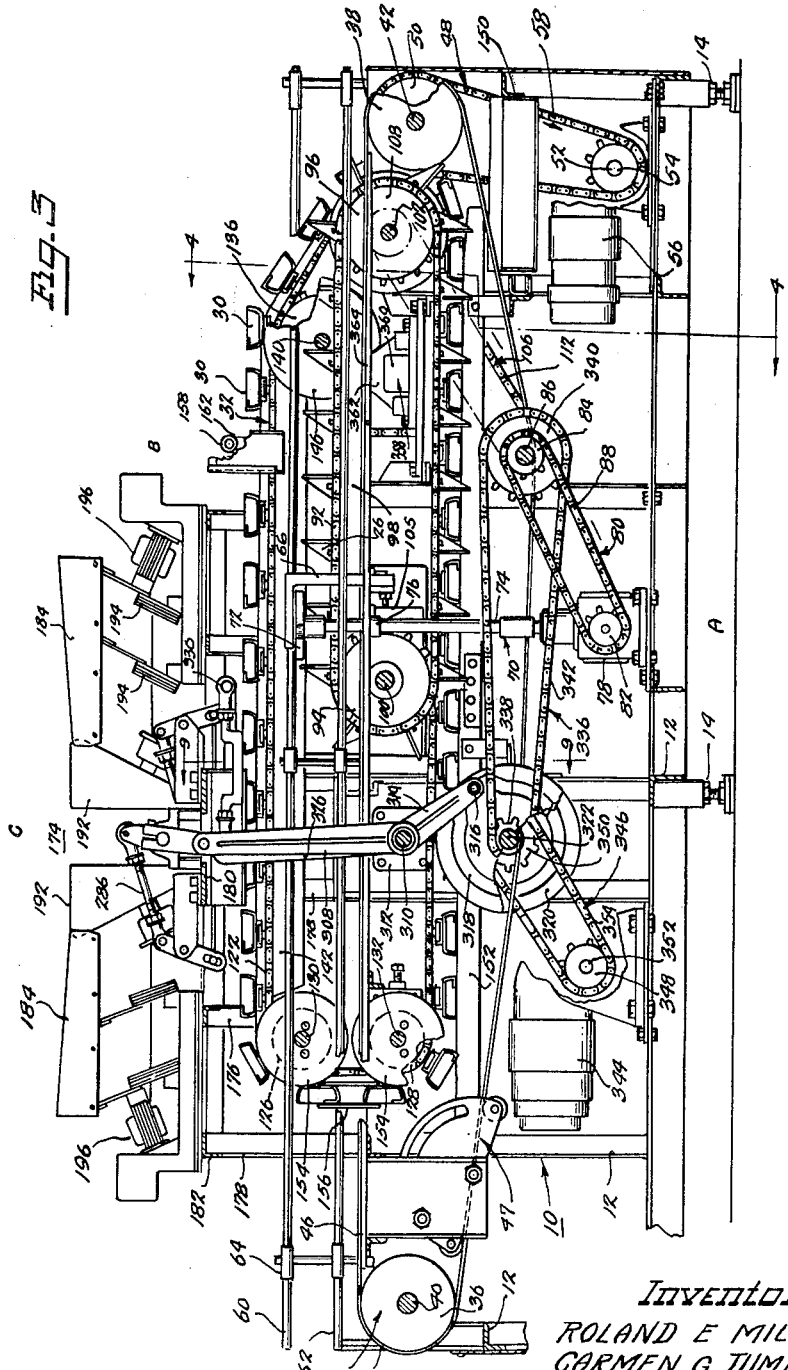

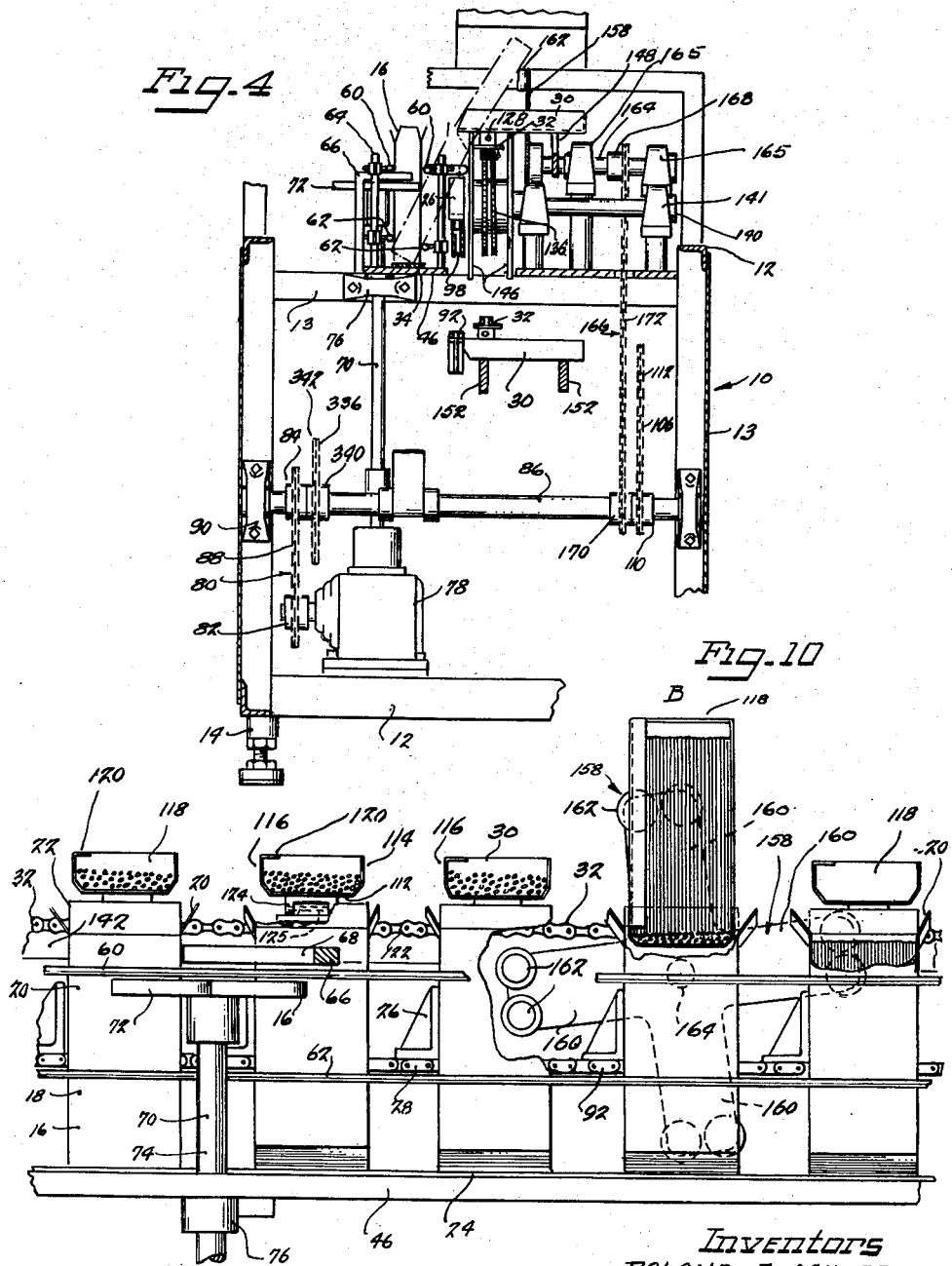

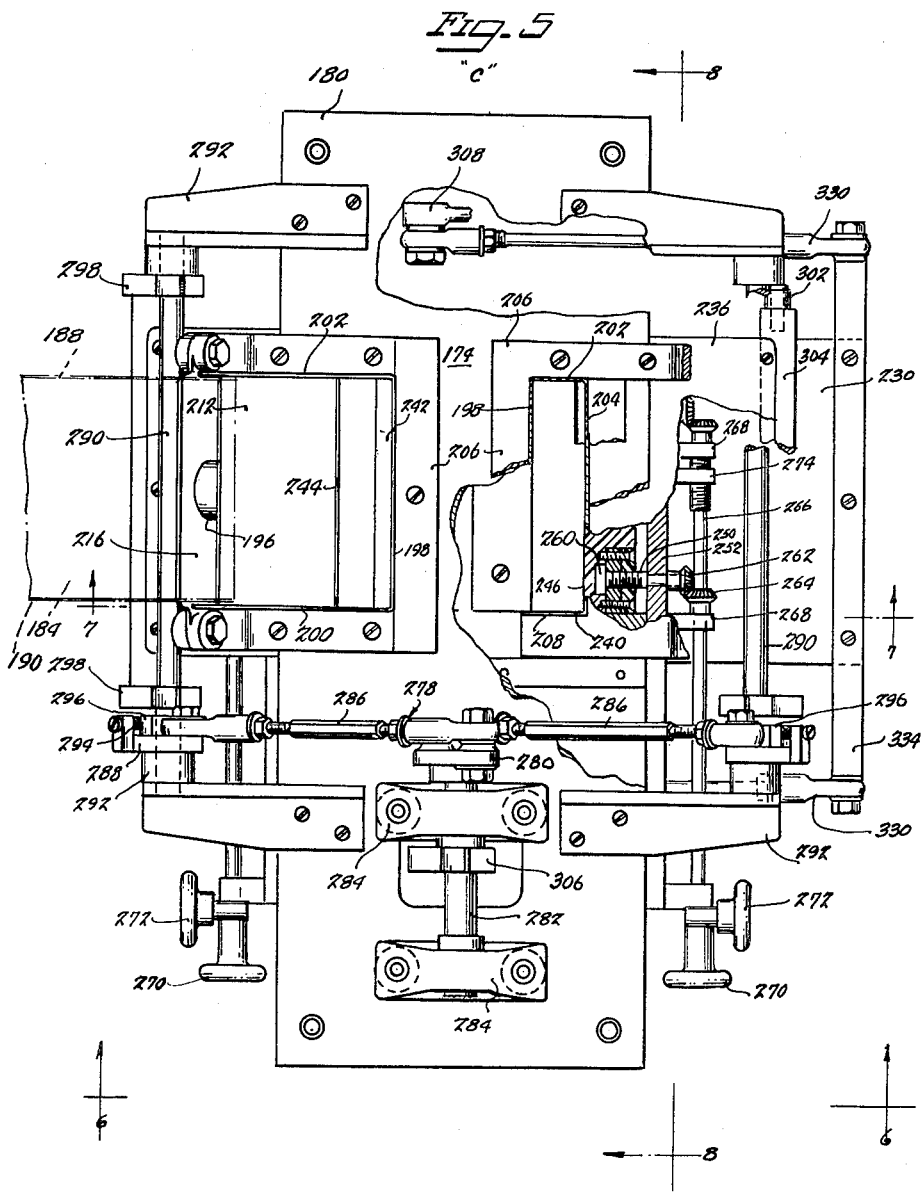

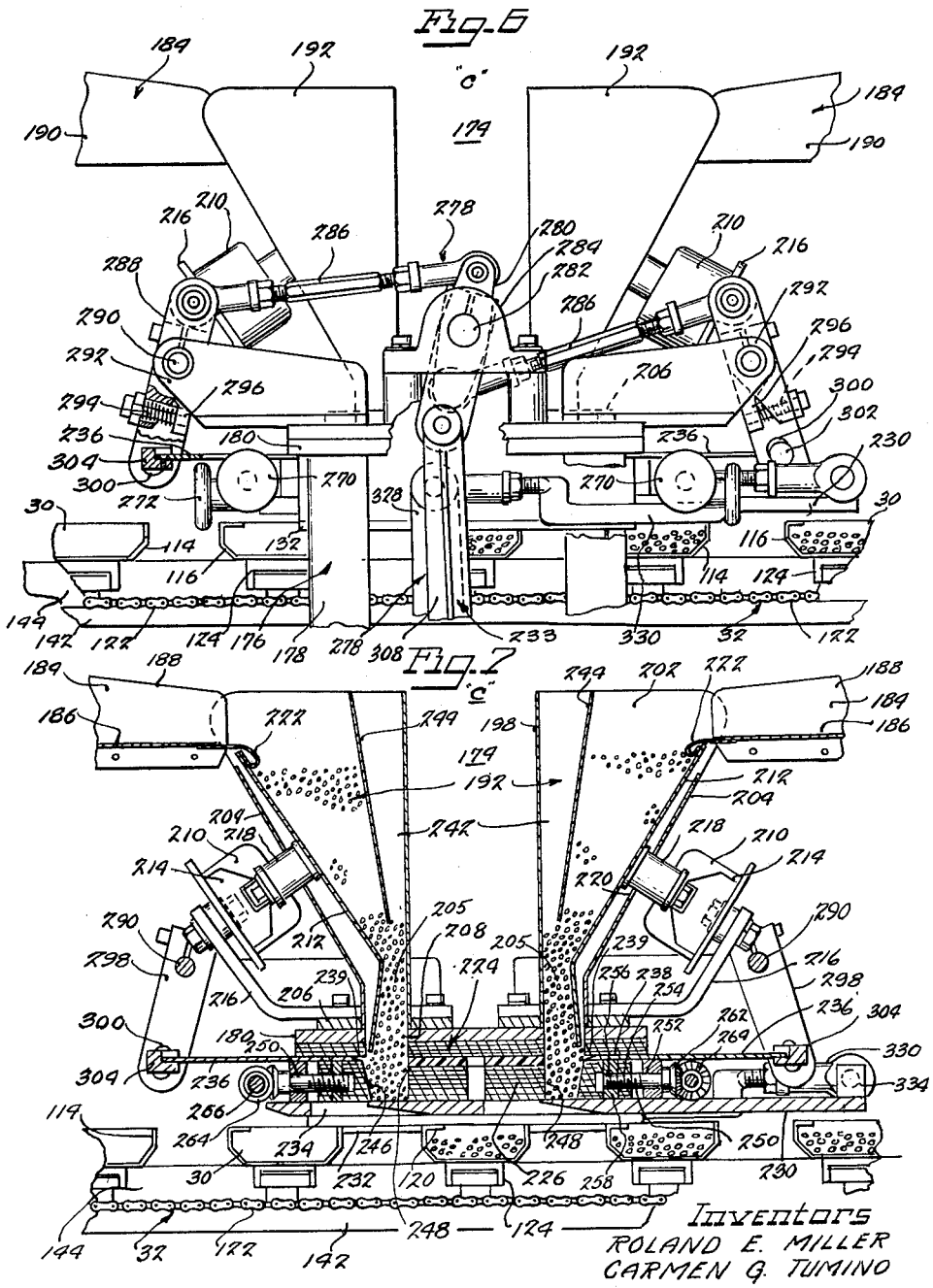

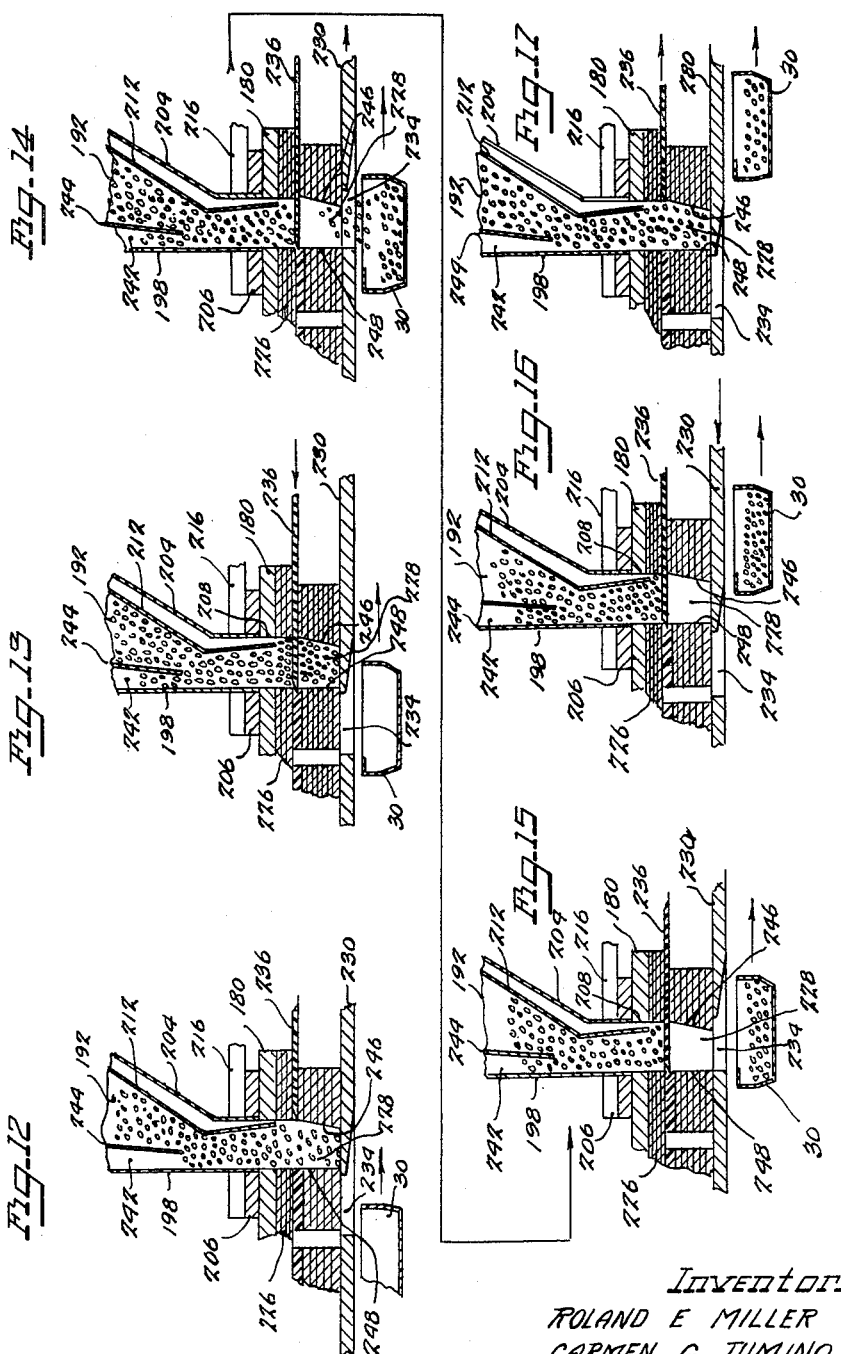

3,145,742
PACKAGING APPARATUS INCLUDING A HOPPER, A METERING ASSEMBLY AND MOVABLE TRAYS
Roland E. Miller, Orangeville, and Carmen G. Tumino, Elk Grove Village, Ill., assignors to National Dairy Products Corporation, Chicago, Ill., a corporation of Delaware
Original application June 10, 1959, Ser. No. 819,333, now Patent 3,027,699. Divided and this application June 16, 1961, Ser. No. 125,022
5 Claims. (Cl. 141—191)

The present invention relates generally to packaging apparatus and more particularly to an apparatus for automatically packaging a predetermined number of brittle articles in a carton. This is a division of our co-pending application Serial No. 819,333, filed June 10, 1959, now Patent No. 3,027,699.

Generally, brittle articles and especially food products such as lengths of spaghetti or macaroni, because of their brittleness have been extremely difficult to automatically package without breakage. One of the main difficulties experienced in packaging such articles has been the metering or separating of a predetermined number of such articles from a hopper or storage container for subsequent delivery to a carton. In previously available packaging apparatus such a metering has generally resulted in some breakage of the articles being packaged.

Accordingly, an object of the present invention is the provision of an apparatus for packaging brittle articles. Another object of the invention is the provision of an apparatus for packaging a predetermined number of lengths of spaghetti or marcaroni in a carton. Still another object is the provision of a packaging machine which is efficient in operation and which is adapted to package spaghetti, macaroni or other items in cartons.

Other objects and advantages of the invention will become apparent by reference to the following description and accompanying drawings.

In the drawings:

FIGURE 1 is a fragmentary side elevational view of an automatic packaging apparatus embodying various features of the invention and including a titling station, a transfer station, and a filling station;

FIGURE 2 is a plan view of the packaging apparatus shown in FIGURE 1:

FIGURE 3 is a vertical sectional view of the packaging apparatus taken along line 3—3 of FIGURE 2, portions being broken away to show various features thereof:

FIGURE 4 is a transverse section view of the packaging apparatus taken along line 4—4 of FIGURE 3;

FIGURE 5 is an enlarged plan view of the filling station of the packaging apparatus shown in the preceding figures, with portions broken away to show the internal construction thereof;

FIGURE 6 is a fragmentary elevational view of the filling station taken generally along line 6—6 of FIGURE 5, portions being broken away to show various features thereof;

FIGURE 7 is a vertical sectional view taken generally along line 7—7 of FIGURE 5;

FIGURE 8 is a transverse sectional view taken generally along line 8—8 of FIGURE 5, with various parts omitted for purposes of clarity;

FIGURE 9 is a fragmentary transverse sectional view taken generally along line 9—9 of FIGURE 3, with various parts omitted for purposes of clarity;

FIGURE 10 is an enlarged elevational view of the titling station and the transferring station shown in FIGURES 1, 2 and 3;

FIGURE 11 is an enlarged simplified perspective view of the tilting station shown in FIGURES 1 through 3; and FIGURES 12 through 17 are diagrammatic view showing successive operating positions of a portion of the filling station shown in FIGURES 5 through 8.

Generally, an apparatus in accordance with the invention comprises a frame having means disposed thereon for moving a series of empty cartons in a predetermined path of travel. Means are provided on the frame for moving a plurality of spaced apart trays in a path of travel in such a relationship with the cartons that one of the trays is associated with one of the cartons. A filling means is provided for successively filling the trays, as they are moved along the path of travel, with a predetermined number of brittle articles. A transferring means is provided for successively transferring the predetermined number of brittle articles from the filled trays to the associated cartons.

More specifically, the packaging apparatus shown in the drawings is adapted to package lengths of spaghetti and includes a main frame 10 which supports all of the operating elements of the packaging apparatus. As shown particularly in FIGURES 1 through 4, the frame 10 is suitably fabricated from structural steel angle bars 12 and plates 13 which are joined together to form an elongated rectangular framework, the framework being supported and leveled by a plurality of adjustable legs 14.

As shown particularly in FIGURES 1 and 2, each of the cartons 16 in which the lengths of spaghetti are to be packaged is elongated and rectangular in shape and includes four interconnected side walls 18 with upper and lower closure walls 20, each of the closure walls 20 having inner and outer closure flaps 22. A series of the cartons 16 with their lower closure flaps 22 sealed closed and with their upper closure flaps 22 open are manually or automatically fed to the left-hand end (as shown in FIGURE 1) of a carton conveyor 24 which extends longitudinally of the frame 10.

The carton conveyor 24 advances the cartons 16 from left to right, as shown in FIGURE 1, which for purposes of explanation will be hereinafter referred to as the forward direction, to various operating stations of the packaging machine. In order to facilitate the understanding of the packaging apparatus of the present invention, before proceeding with a complete description of the apparatus, the action of the various operating stations of the packaging apparatus will be briefly described.

Referring to FIGURE 1, each carton is advanced in the forward direction by the carton conveyor 24 to a tilting station A wherein the carton 16 is stopped and the upper portion of the carton 16 is moved transversely of the path of travel a distance such that the upper portion of the rearward wall 18 of the tilted carton 16 is engaged by one of a plurality of upstanding lugs 26 carried by a timing conveyor 28 located in adjacent relationship to the carton conveyor 24. The timing conveyor 28 propels the tilted carton 16 forward through a transferring station B wherein the carton is filled with a predetermined number of lengths of spaghetti, the spaghetti being transferred to the tilted carton 16 from an associated tray 30 which is tipped to transfer the spaghetti therein to the carton 16. The predetermined number of lengths of spaghetti is deposited in the tray 30, which is one of a plurality of trays 30 carried by a tray conveyor 32, at a filling station C disposed above the tray conveyor 32 rearward of the transferring station B. After the carton 16 is filled it is righted, after which the carton conveyor 24 propels the filled carton 16 to the forward end of the frame 10 where the carton 16 is removed from the carton conveyor 24 for subsequent operations.

As shown particularly in FIGURES 2 and 3 the carton conveyor 24 includes a longitudinally extending endless conveyor belt 34 which is supported at the rear end of the frame 10 by an idler pulley 36 and at the forward end of the frame 10 by a driven pulley 38. The pulleys 36 and 38 are mounted for rotation on a transversely extending shafts 40 and 42, respectively, the ends of which are journaled in bearings 44 suitably mounted to the frame 10.

The upper run of the conveyor belt 34 is supported intermediate the front and rear pulleys 36 and 38 by a longitudinally extending, horizontally disposed plate 46 which is suitably attached to the frame 10. The slack in the conveyor belt 34 may be adjusted to the extent desired by an adjustable belt-tensioning device 47 which engages the lower run of the conveyor belt 34 adjacent the idler pulley 36.

As shown in FIGURES 2 and 3, the shaft 42 of the driven pulley 38 is rotated by a roller chain drive 48 which includes a sprocket 50 fixedly mounted to the shaft 42, a sprocket 52 fixedly mounted to the shaft 54 of a drive motor 56, which is suitably mounted to the frame 10, and a roller chain 58 trained about the sprockets 50 and 52.

The cartons 16 are maintained in an upright position as they are propelled through the rearward portion of the apparatus by the carton conveyor 24 by a pair of vertically spaced, longitudinally extending elongated guide rods 60 and 62 disposed adjacent each side of the respective cartons 16, one of each pair of guide rods 60 being located near the upper portion of the respective cartons 16 and one 62 being located near the lower portion of the respective cartons 16. The guide rods 60 and 62 are supported in position by brackets 64 which are suitably attached to the frame 10.

The carton conveyor 24 advances each carton 16 forward on the frame 10 to the tilting station A where the carton 16 is stopped by a stopping means 66 which, as shown in FIGURES 3 and 11, includes a horizontally disposed angle member 68 suitably mounted to the frame 10 and adapted to engage the forwardmost side of the upper portion of the carton 16. The carton 16, after it is stopped by the stopping means 66, is tilted toward the timing conveyor 28 by a tilting mechanism 70. The upper guide rods 60 are suitably offset toward the timing conveyor 28 and the lower guide rod 62 located away from the timing conveyor 28 is spaced slightly above the other lower guide rod 62 so that the cartons 16 may be tilted.

The tilting mechanism 70 includes a horizontally disposed four-arm star wheel 72 adapted to engage the upper portion of the outer side of the carton 16 and tilt the carton 16. As shown in FIGURE 3, the star wheel is fixedly mounted to the upper end of a vertically disposed shaft 74 which is journaled in bearings 76 suitably mounted to the frame 10, the lower end of the shaft 74 being connected to a miter gear box 78 suitably mounted to the frame 10. The miter gear box 78 is driven by a roller chain drive 80 which includes a sprocket 82 connected to the miter gear box 78, a sprocket 84 fixedly mounted to a transversely extending driven shaft 86, and a roller chain 88 trained about the sprockets 82 and 84. The driven shaft 86 is journaled in bearings 90 (FIGURES 2 and 4) suitably mounted to the frame 10, the driven shaft 86 being rotated by a driving mechanism which will be explained in detail hereinafter.

When each carton is tilted by the star wheel 72, the rear surface thereof is engaged by one of the plurality of longitudinally spaced apart upstanding lugs 26 carried by the timing conveyor 28 which extends longitudinally of the frame 10. As shown in FIGURES 3 and 4, the timing conveyor 28 includes a double width roller chain 92 which is supported at its rearward end by an idler sprocket 94 and at its forward end by a driven sprocket 96, the upstanding lugs 26 being suitably attached to the chain 92. The upper run of the roller chain 92 intermediate the sprockets 94 and 96 is supported by a pair of longitudinally extending coextensive rails 98 (FIGURE 4) suitably mounted to the frame 10.

The idler and driven sprockets 94 and 96 are fixedly mounted on transversely extending shafts 100 and 102, respectively (see FIGURES 2, 3 and 4), the ends of which are journaled in bearings 105 and 104, respectively, suitably mounted to the frame 10. The forward shaft 102 is continually driven in timed relation to the miter gear drive 78 of the tilting mechanism 70 by a roller chain drive 106 including a sprocket 108 fixedly mounted to the forward shaft 102, a sprocket 110 fixedly mounted to the driven shaft 86, and a roller chain 112 trained about the sprockets 108 and 110.

The timing conveyor 28 propels each tilted carton 16 forward on the frame 10 through the transferring station B wherein a tray 30 which is spaced above and transversely of the upper end of the tilted carton 16 is tilted to transfer the lengths of spaghetti contained therein to the associated tilted carton 16. The tray 30 is one of a plurality of transversely extending, longitudinally spaced apart trays 30 carried by the tray conveyor 32 which extends longitudinally of the frame 10.

Each tray 30, as shown particularly in FIGURES 2 and 10, includes a bottom wall 112, a forward wall 114, a rearward wall 116, and a left hand side wall (i.e. the side farthest from the timing conveyor 28) 118, the tray being open on its right side so that when the tray 30 is tilted, as hereinafter described, the contents thereof may be transferred to the associated carton 16. In order to prevent the lengths of spaghetti from spilling over the rearward wall 116 of the tray 30 as the tray 30 is propelled along the frame 10, the rearward wall 116 is provided with an upper forwardly directed lip 120.

Each of the trays 30 is pivotally mounted to a double width roller chain 122 so that the tray 30 may be tipped about a pivot-point adjacent its right side (i.e. the side closest to the timing conveyor 28). As illustrated in FIG. 10, the pivot is provided by a pair of spaced apart bearings 124 attached to the bottom of each tray 30, the bearings 124 engaging a shaft 125 suitably attached to the roller chain 122.

As shown in FIGURE 3, the rearward end of the roller chain 122 is trained about a pair of spaced apart, vertically aligned idler sprockets 126 and 128 fixedly mounted to transversely extending shafts 130 and 132, respectively, the ends of the shafts 130 and 132 being journaled in bearings 134 (FIGURE 2) suitably mounted to the frame 10. The forward end of the roller chain 122 is trained about a pair of vertically spaced apart sprockets 136 and 138 (see FIGURE 2), the lower sprocket 138 being disposed further forward on the frame 10 than the upper sprocket 136. The upper sprocket 136 is fixedly mounted to a transversely extending shaft 140 which is journaled in bearings 141 suitably mounted to the frame 10, and the lower sprocket 138 is fixedly mounted to the forward shaft 102 of the timing conveyor 28 so as to be driven continually in timed relationship therewith. The upper run of the tray conveyor is supported intermediate the upper sprockets 126 and 136 by a pair of longitudinally extending, vertically disposed, coextensive rails 142 suitably mounted to the frame 10.

In the upper run of the tray conveyor 32, the left hand side 118 (looking forward on the frame 10) of the respective trays 30 is prevented from pivoting downward by a longitudinally extending elongated rail 144 suitably mounted to the frame and spaced transversely of the roller chain 122 a distance such that the left portion of the respective trays 30 rides thereon. Also, since the trays 30 are pivotally mounted to the roller chain 122, the left hand side 118 of each tray 30 is suitably retained in the vertical and the lower runs of the tray conveyor 32 to prevent the trays 30 from swinging haphazardly.

In the illustrated embodiment, to keep the trays 30 from swinging during their downward travel, the forward sprockets 136 and 138 are provided with side flanges 146, as shown in FIGURES 2 and 4, which are of such a diameter that the lower surface of the respective trays 30 rides thereon. The trays 30 are maintained in their transverse position intermediate the two forward sprockets 136 and 138 by an elongated guide rail 148 extending downwardly at an angle near the left hand portion of the respective trays 30, and being suitably mounted to the frame 10.

As the trays 30 are propelled about the lower corner of the downward run, the trays 30 are inverted thereby spilling out any particles remaining therein. In the illustrated embodiment, a transversely extending chute 150, which is suitably attached to the frame 10, is provided beneath the tray conveyor 32 to catch these particles.

In the lower run of the tray conveyor 32, the trays 30 are prevented from swinging by a pair of coextensive, longitudinally extending, spaced apart rails 152 (FIGURE 4) suitably mounted to the frame 10 and vertically disposed so as to engage the edges of the forward and rearward walls 114 and 116 of the respective trays 30.

The rear sprockets 126 and 128 are likewise provided with flanges 154 which are of such a diameter that the lower surface of the respective trays 30 rides thereon, thereby preventing the trays 30 from swinging upon rounding the rearward corners of the upward run of the tray conveyor 32. As shown in FIGURES 2 and 3 between the two rearward sprockets 126 and 128, the trays 30 are prevented from swinging by a vertically disposed channel 156 suitably mounted to the frame 10 and located so that the left hand side of the respective trays 30 is retained thereby.

The trays 30 are successively tipped at the transferring station B by a vertically disposed tipping wheel 158 disposed between the roller chain 122 and the upper tray rail 144 at such a height as to successively lift the left hand side of the respective trays 30 and move the tray 30 to a tipped position in which the lengths of spaghetti therein are transferred to the associated tilted carton 16.

As shown particularly in FIGURE 10, the tipping wheel 158 includes four radially extending rectangular arms 160 each having a pair of spaced apart rollers 162 rotatably mounted thereto adjacent its outermost end, the rollers 162 being disposed on the surface facing the pivot connection of the respective trays 30. The tipping wheel 158 is fixedly mounted, as shown in FIGURES 4 and 10, to a transversely extending shaft 164, the shaft 164 being journaled in bearings 165 suitably mounted to the frame 10. The shaft 164 of the tipping wheel 158 is driven in timed relation to the movement of the trays 30 by a roller chain drive 166 which includes a sprocket 168 fixed to the shaft 164, a sprocket 170 (see FIGURE 4) attached to the driven shaft 86, and a roller chain 172 trained about the sprockets 168 and 170.

The trays 30 are successively filled with a predetermined number of lengths of spaghetti at the filling station C which, as previously indicated, is disposed above the tray conveyor 32, rearwardly of the transferring station B. The filling station C includes a dual filling mechanism 174 mounted to a subframe 176 which, in turn, is mounted to the frame 10. The subframe 176, as shown in FIGURES 2 and 3 includes a plurality of upright angle bars 178 extending upwardly from the sides of the main frame 10 with a transversely extending, horizontally disposed mounting plate 180 and a plurality of angle bars 182 spanning the upper ends of the upright angles 178.

Each of the filling mechanisms 174 is adapted to separate a predetermined number of lengths of spaghetti from the stacked lengths thereof generally without breaking any of the lengths, and successively fill alternate trays 30 with the predetermined number of spaghetti lengths as the trays 30 pass beneath the filling mechanism 174. While in the illustrated embodiment the filling mechanism 174 is a dual unit, which is adapted to simultaneously fill two of the trays 30, for purposes of explanation, only the forwardmost of the filling mechanisms 114 will be described in detail.

As illustrated particularly in FIGURES 2 and 3, the lengths of spaghetti to be packaged are placed in a longitudinally extending trough 184 so that they extend generally transversely thereof. The trough 184 which is slightly wider than the lengths of spaghetti, includes a lower wall 186, a left hand side wall 188, and a right hand side wall 190, the lower wall being sloped rearwardly toward a vertically disposed hopper 192. To aid in the movement of the spaghetti along the trough 184, the loading trough 184 which is resiliently mounted to the subframe 176 by laminated supports 194, is vibrated by a solenoid 196, the solenoid 196 being suitably mounted to the subframe 176.

As illustrated in FIGURES 6 through 8, the hopper 192 has a rectangular, horizontal cross section and includes vertically disposed rearward, right hand and left hand side walls 198, 200, and 202, respectively, and a forward wall 204 the upper portion of which extends downwardly at an angle toward the rear wall, and the lower portion of which extends vertically whereby a reduced neck portion 205 is provided at the lower end of the hopper 192. The hopper is mounted to the mounting plate 180 by suitable means such as a flange 206 disposed on the lower end of the hopper 192. A slot 208 is provided in the mounting plate 180 beneath the hopper 192 to permit the lengths of spaghetti to pass therethrough.

The lengths of spaghetti within the hopper 192 are settled by a vibrator 210 connected to a freely movable sub wall 212 within the hopper which sub wall is spaced a short distance from the forward wall 204 of the hopper 192, the lower portion of the sub wall 212 extending forwardly at a slight angle. The vibrator 210 includes a solenoid 214 connected to the sub frame 176 by a suitable means such as a bracket 216 connected to the flange 206 of the hopper 192. The armature 218 of the solenoid 214 extends through an aperture 220 in the forward wall 204. The armature 218 is connected to and supports the sub wall 212. To prevent the length of spaghetti from falling between the sub wall 212 and the forward wall 204, a flexible strip 222 is connected between the rearward edge of the trough 184 and the upper edge of the sub wall 212.

As shown particularly in FIGURE 7, a predetermined number of lengths of spaghetti is separated from the stacked lengths within the hopper 192 by a metering device 224 disposed below the hopper and suitably mounted to the underside of the mounting plate 180. The metering device 224 illustrated includes a body 226 composed of a plurality of superimposed horizontally disposed laminations arranged so as to form a vertically extending conduit 228 which is in communication with the slot 208 and the hopper 192.

The conduit 228 is closed at its lower end by a lower retractable, horizontally extending closure wall or plate 230 which is slidably mounted on the underside of the body 226 by a pair of longitudinally extending rails 232 (see FIGURE 7). The closure plate 230 is horizontally reciprocated by a reciprocating means 233, described hereinafter, between an extended or closed position and an open or retracted position, wherein a slot 234 in the closure plate 230 is moved to a position in alignment with the lower end of the conduit 228.

The predetermined number of lengths of spaghetti is separated from the remaining spaghetti in the hopper 192 by an upper retractable, horizontally disposed relatively thin closure wall or plate 236. The upper plate 236 is slidably mounted in a slot 238 which extends into the upper portion of the forward wall of the body 226 of the metering device 224, the inner edge 239 of the upper plate being beveled downwardly. The upper closure plate 236 is reciprocated by the reciprocating means 233 between an extended or closed position and a retracted position, the upper and the lower plates being reciprocated in alternately opening and closing relationship. When the upper closure plate 236 is moved to its closed position while the lower closure plate 230 is in its closed position, the predetermined number of lengths of spaghetti is segregated in the conduit 228 between the lower and upper closure plates 230 and 236. When the upper plate 236 is moved to its retracted position, a notch 240 in the rearward end of the upper closure plate 236 is aligned with the conduit 228 thereby permitting the lengths of spaghetti to pass into the lower portion of the conduit 228.

When the upper closure plate 236 is moved into its closed position while the lower closure plate 230 is in its closed position, because of the downwardly beveled forward edge of the upper plate 236, a number of lengths of spaghetti are displaced upwardly. To prevent a possible breakage of the lengths of spaghetti due to the weight of the overlying lengths of spaghetti restricting the upward displacement thereof, a portion 242 of the hopper 192 is set aside to allow for such a displacement and also a portion of the weight of the overlying lengths is supported by the forwardly extending lower portion of the subwall 212. In the illustrated embodiment, the portion 242 of the hopper 192 is set aside from the main portion of the hopper 192 by a wall 244 which is spaced from the rearward wall 198 of the hopper 192 and extends upwardly at a forward angle from the neck portion of the hopper 192. Thus, the spaghetti lengths displaced by the upper plate 236 are allowed to move upwardly since the overlying lengths of spaghetti are moved into the portion 242 of the hopper 192.

The amount of spaghetti segregated between the lower and upper closure plates 230 and 236 is determined by the volume defined by the side walls of the conduit 228 and the lower and upper closure plates 230 and 236. In the illustrated embodiment, the volume is adjustable and thus the number of lengths of spaghetti is varied by providing the conduit 228 with a forward wall section 246 which is movable relative to the rearward wall 248 of the conduit 228. As particularly shown in FIGURES 5 and 7, the forward wall section 246 is adjustably positioned by a pair of longitudinally extending, transversely spaced apart shafts 250 each of which is journaled in a bearing 252 suitably mounted to the subframe 176. The rearward end of each of the shafts 250 extends through an aperture 254 in the forward wall section 246 and is threadedly engaged in a threaded aperture 256 in a block 258 suitably mounted within an aperture 260 in the forward wall section.

Attached to the forward end of each shaft is a bevel gear 262 which is driven by a cooperating bevel gear 264 fixedly mounted to a transversely extending shaft 266, the shaft 266 being journaled in bearings 268 suitably mounted to the subframe 176. The right hand outer end of the transverse shaft 266 is provided with a knob 270 by which the forward wall section 246 of the conduit 228 may be manually moved relative to the rearward wall 248 of the conduit 228, the transverse shaft 266 being locked in position by a spring biased dog 272. A screw operated indicator 274 is provided on the shaft 266 to indicate the position of the forward wall section 246.

The rearward filling mechanism 174 is constructed in a similar manner as the forward filling mechanism 174 described above except that, for convenience, the lower closure plate 230 of the forward filling mechanism 174 is extended rearwardly and is slotted so that the same plate serves as a lower closure plate for the forward and rearward filling mechanisms 174.

The lower and upper closure plates 230 and 236 of the forward and rearward filling mechanisms 174 are reciprocated in timed relation to the movement of the tray conveyor 32 by reciprocating means 233 in a manner such that the trays 30 are successively filled in pairs. As shown particularly in FIGURES 5 through 8, reciprocating means includes a link means 278 which reciprocates the upper closure plates 236 in unison with each other. The link means 278 includes a rocker arm 280 which is fixedly mounted intermediate its length to a transversely extending shaft 282, the shaft 282 being journaled in bearings 284 suitably mounted to the subframe 176. Each end of the rocker arm 280 is rotatably connected to one end of an adjustable link 286.

The other end of the respective adjustable links 286 is rotatably connected to uppermost end of a second rocker arm 288 which is journaled intermediate its length on a transversely extending shaft 290, the ends of the shaft 290 being journaled in bearings 292 suitably mounted to the mounting plate 180 of the subframe 176. The lowermost end of the second rocker arm 288 is resiliently connected by a retained spring 294 or such to the outer end of a crank arm 296 which is fixedly connected to the shaft 290.

The movement of the shaft 290 is transmitted to the upper closure plate 236 by a pair of spaced apart crank arms 298 fixedly attached to the shaft 290. The outer ends of the crank arms 298 are provided with slots 300 for receiving circular end portions 302 of a rectangular rod 304 connected to the outer end of the associated upper closure plates 236.

The shaft of the first mentioned rocker arm 280 is rotated by a crank arm 306 fixedly secured thereto, the outer end of the crank arm 306 being rotatably connected to the upper end of the upwardly extending crank arm 308 which is fixedly secured at its lower end to a transversely extending rocker shaft 310 (see FIGURE 9). The rocker shaft 310 which is journaled in bearings 312 suitably mounted to the frame 10 is rocked by a pair of spaced apart crank arms 314, each being fixedly secured by one end to the rocker shaft 310 and being provided with a cam roller 316 at its outer end. The cam roller 316 of each of the crank arms 314 is adapted to engage the groove 318 in a plate cam 320 which is fixedly mounted to a transversely extending shaft 322, the shaft being journaled in bearings 324 suitably mounted to the frame 10.

The lower closure plate 230 which, as indicated previously, is common to the forward and rear filling mechanisms 174, is reciprocated by a pair of spaced apart link means 326 (see FIGURE 9) connected between the rocker shaft 310 and the lower closure plate 230. Each link means 326 includes a generally upwardly extending crank arm 328 fixedly secured at its lower end to the rocker shaft 310, and rotatably connected, as shown in FIGURE 6, at its upper end to one end of an adjustable link 330. The illustrated adjustable link 330 is offset downwardly in order to clear the subframe 176. The other end of the adjustable link 330 is rotatably connected to a circular end portion of a transversely extending bar 334 fixedly connected to the forward end of the lower closure plate 230.

As shown particularly in FIGURE 3, the upper and lower closure plates of the filling mechanisms 174 are reciprocated in timed relation to the tray conveyor 32 by a roller chain drive 336 including a sprocket 338 fixedly mounted on the plate cam shaft 322, a sprocket 340 mounted on the driven shaft 86 of the tray conveyor 32, and a roller chain 342 trained about the sprockets 338 and 340.

Motive power for the plate cam shaft 322 is provided by an electric motor 344 suitably mounted to the frame 10 and connected to the plate cam shaft 322 by a roller chain drive 346 including sprockets 348 and 350 fixedly mounted respectively to the drive motor's shaft 352 and the plate cam shaft 322, and a roller chain 354 trained about the sprockets. To properly correlate the timing of the various stations during initial setup, the apparatus may be operated manually by a hand wheel 356 fixedly connected to one end of the forward shaft 102 of the tray conveyor 32.

The timing of each of the filling mechanisms 174 and the tray conveyor 32 is such that in operation, as shown diagrammatically in FIGURE 12 the lower closure plate 230 is in its extended position and the upper closure plate 236 is in its retracted position when a tray 30 is not located beneath the conduit 228. As the tray 30 is moved along by the tray conveyor 32 to a position approximately beneath the conduit 228, the upper closure plate 236 is moved to its extended position, as shown in FIGURE 13, thus displacing its volume in lengths of spaghetti, the lengths being moved into the set aside portion 242 of the hopper 192. When the tray reaches a position beneath the conduit, as shown in FIGURE 14, the lower closure plate 230 is moved to its retracted position thus depositing the predetermined number of lengths of spaghetti into the continuously moving tray 30. The mouth of the tray 30 is made substantially wider than the conduit 228 to allow for the continual movement of the tray 30 while the spaghetti lengths are falling. Subsequently, the lower closure plate 230, as shown in FIGURES 15 through 17, is moved to its extended position and the upper closure plate is moved to its retracted position. As previously indicated, the two filling mechanisms 174 operate in unison with each other, thus successively filling the trays 30 in pairs.

After the lengths of spaghetti are successively transferred from each tray 30 to the associated carton by the tipping of the tray at the transferring station B, the tray 30 returns to its normal position through the action of gravity.

To settle the lengths of spaghetti in the cartons 16 and thereby prevent individual lengths of spaghetti from sticking above the upper edge of the respective cartons 16, the cartons 16 are successively vibrated by a vibrator 358 disposed below the carton conveyor belt (see FIGURE 3). In the illustrated embodiment, the vibrator 358 includes a solenoid 360, suitably mounted to the frame 10, the armature 362 of the solenoid 360 being suitably connected to a separated section 364 of the upper support plate 46 of the carton conveyor 24.

The cartons 16 with the lengths of spaghetti therein are then successively righted as the cartons are propelled along the frame 10 through the camming action of the upper pair of guide rods 60 which, as shown in FIGURE 2, are offset back into position in vertical alignment with the lower guide rods 62.

The cartons 16 are then advanced by the carton conveyor 24 to the forward end of the frame 10 where the filled cartons 16 may be removed for subsequent operations such as inserting additional ingredients therein, closing the upper closure flaps 22, and packing the cartons 16 of spaghetti into shipping cartons.

In operation, the empty cartons 16 are fed to the rearward end of the carton conveyor 24 which propels each carton 16 forward along the frame 10, the carton 16 being guided therealong by the guide rails 60 and 62 until the carton 16 is stopped by the stopping means 68 at the tilting station A. At the tilting station A, the carton is tilted by the star wheel 72 so that it is engaged by one of the upstanding lugs 26 on the continually driven timing conveyor 28 which then moves the tilted carton 16 forward along the frame 10. Associated with the tilted carton 16 is one of the trays 30 which is continually propelled along by the tray conveyor 32 in timed relationship with the associated carton 16, the trays 30 having been filled with a predetermined number of lengths of spaghetti at the filling station C. At the transferring station B, the tray 30 is tipped to transfer the lengths of spaghetti therefrom into the associated carton 16. Then, the lengths of spaghetti in the carton 16 are settled by the vibrator 358 and the carton 16 is righted through the camming action of the guide rods 60 as the carton 16 is propelled by the carton conveyor 24 to the forward end of the apparatus.

While the above described apparatus is particularly adapted to package lengths of spaghetti, it should be realized that other brittle articles, such as macaroni, straws, etc., may be packaged in accordance with the invention. Various changes and modifications may be made in the above described packaging apparatus without departing from the spirit or scope of the invention. Various of the features of the invention are set forth in the following claims:

We claim:

1. A packaging apparatus of the type described, comprising a plurality of spaced apart trays, means for continuously moving the trays along a predetermined path of travel, each of said trays having a forward extending lip on the rear wall thereof, and metering means for depositing brittle articles in the trays, said metering means comprising means defining a generally vertically extending conduit, a lower horizontally extending retractable closure plate in said conduit, an upper horizontally extending retractable closure plate spaced above said lower plate in said conduit, said upper closure plate and said lower closure plate being movable between an extended position wherein the conduit is closed and a retracted position wherein the conduit is open, first means for reciprocating said upper closure plate between its extended position and its retracted position, second means for reciprocating said lower closure plate between its extended position and its retracted position, third means connected to said first means and to said second means for correlating the movement of the upper and lower closure plates so that the upper and lower closure plates are reciprocated in alternately opening and closing relationship, so that said upper closure plate remains in its extended position until said lower plate reaches its extended position, and so that said lower plate remains in its extended position until said upper plate reaches its extended position, hopper means disposed above said conduit and in communication therewith, a generally vertically extending wall dividing said hopper means into two chambers which are in communication with each other at the lower end of the hopper, and means for feeding a plurality of brittle articles into only one of said chambers, the other chamber receiving articles displaced by said upper plate moving from its retracted position to its extended position while said lower plate is in its extended position thereby preventing breakage of said articles, and means connected to said third means and to said tray moving means for operating said third means in timed relation with the continuous movement of the trays so that the lower plate remains in its extended position until one of the trays is below the conduit.

2. A packaging apparatus of the type described, comprising a plurality of spaced apart trays, means for continuously moving the trays along a predetermined path of travel, each of said trays having a forward extending lip on the rear wall thereof, and metering means for depositing brittle articles in the trays, said metering means comprising means defining a generally vertically extending conduit, a lower horizontally extending retractable closure plate in said conduit, an upper horizontally extending retractable closure plate spaced above said lower plate in said conduit, said upper closure plate and said lower closure plate being movable between an extended position wherein the conduit is closed and a retracted position wherein the conduit is open, first means for reciprocating said upper closure plate between its extended position and its retracted position, second means for reciprocating said lower closure plate between its extended position and its retracted position, third means connected to said first means and to said second means for correlating the movement of the upper and lower closure plates so that the upper and lower closure plates are reciprocated in alternately opening and closing relationship, so that the upper plate remains in its extended position until said lower plate reaches its extended position, and so that said lower plate remains in its extended position until said upper plate reaches its extended position, a section of the side wall of said conduit between said upper and lower plates being horizontally adjustable relative to the opposite side wall whereby the volume defined by the conduit between the upper and lower plates is adjustable, hopper means disposed above said conduit and in communication therewith, a generally vertically extending wall dividing said hopper means into two chambers which are in communication with each other at the lower end of the hopper, and means for feeding a plurality of brittle articles into only one of said chambers, the other chamber receiving articles displaced by said upper plate moving from its retracted position to its extended position while said lower plate is in its extended position thereby preventing breakage of said articles, and means connected to said third means and to said tray moving means for operating said third means in timed relation with the continuous movement of the trays so that the lower plate remains in its extended position until one of the trays is below the conduit.

3. A packaging apparatus of the type described, comprising a plurality of spaced apart trays, means for continuously moving the trays along a predetermined path of travel, each of said trays having a forward extending lip on the rear wall thereof, and metering means for depositing brittle articles in the trays, said metering means comprising means defining a generally vertically disposed conduit, the lower end of which is spaced above the path of travel of said trays, a hopper extending generally upwardly from said conduit and in communication therewith, a lower horizontally extending retractable closure plate in said conduit, an upper horizontally extending retractable closure plate spaced above said lower plate in said conduit, said upper closure plate having a downwardly beveled forward edge, said upper plate and said lower plate being movable between an extended position wherein the conduit is closed and a retracted position wherein the conduit is open, first lever means for reciprocating said upper closure plate between its extended position and its retracted position, second lever means for reciprocating said lower closure plate between its extended position and its retracted position, a continuously operated cam means connected to said first lever means and said second lever means, said cam means being shaped so that the upper and lower closure plates are reciprocated in alternately opening and closing relationship, so that the lower closure plate remains in its extended position until the upper closure plate reaches its extended position, and so that the upper closure plate remains in its extended position until the lower closure plate reaches its extended position, means connected to said cam means and to said tray moving means for operating the cam means in timed relationship with the movement of the trays so that the lower plate remains in its extended position until one of the trays is below the conduit, an upwardly extending wall disposed transversely of the path of movement of the upper closure plate for dividing said hopper into two parts disposed successively along the path of movement of the upper closure plate, the lower edge of said wall being spaced above said upper plate, said wall being positioned within the hopper so that brittle articles delivered to the hopper do not enter the part of the hopper closer to the forward edge of the upper closure plate when said upper closure plate is in its extended position whereby said one part is set aside for receiving the brittle articles displaced by said upper plate moving from its retracted position to its extended position while said lower plate is in its extended position.

4. A packaging apparatus of the type described comprising a plurality of spaced apart trays, means for continuously moving the trays along a predetermined path of travel, each of said trays having a forward extending lip on the rear wall thereof, and metering means for successively depositing a predetermined number of brittle articles in said trays, said metering means comprising a generally vertically disposed conduit, the lower end of which is spaced above the path of travel of said trays, a hopper extending generally upwardly from said conduit and in communication therewith, a lower horizontally extending retractable closure plate in said conduit, an upper horizontally extending retractable closure plate spaced above said lower plate in said conduit, said upper plate and said lower plate being movable between an extended position wherein the conduit is closed and a retracted position wherein the conduit is open, first lever means for reciprocating said upper closure plate between its retracted position and its extended position, second lever means for reciprocating said lower closure plate between its retracted position and its extended position, cam means connected to said first lever means, and to said second lever means and being shaped to reciprocate the upper and lower closure plate in alternately opening and closing relationship, to keep the lower closure plate in its extended position until the upper closure plate reaches its extended position, and to keep the upper closure plate in its extended position until the lower plate reaches its extended position, means connected to said cam means and to said tray moving means for operating the cam means in timed relationship with the movement of the trays so that the lower plate remains in its extended position until one of the trays is below the conduit, a section of the side wall of said conduit between said upper and lower plates being horizontally adjustable relative to the opposite side wall whereby the volume defined by the conduit between the upper and lower plates is adjustable, an upwardly extending wall dividing said hopper into two parts, the lower edge of said wall being spaced above said upper plate, said wall being positioned within the hopper so that brittle articles delivered to the hopper do not enter one of the parts of the hopper, whereby said one part is set aside for receiving the britle articles displaced by said upper plate moving from its retracted position to its extended position while said lower plate is in its extended position.

5. A packaging apparatus of the type described comprising a plurality of spaced apart rectangular trays, means for continuously moving the trays along a predetermined path of travel, each of said trays having a lip extending forward from the rear wall thereof, and means for successively depositing a predetermined number of lengths of spaghetti in the trays, said depositing means comprising means defining a generally vertically disposed rectangular conduit, the lower end of which is spaced above the path of travel of said trays, a generally rectangular hopper extending generally upwardly from said conduit and in communication therewith, a generally vertically extending freely movable sub wall disposed within said hopper and the upper portion of said conduit adjacent one wall thereof, means connected to the upper end of said sub wall for delivering the lengths of spaghetti to the upper end of a part of the hopper defined by the other three walls of the hopper and the sub wall, a lower horizontally extending retractable closure plate in said conduit, an upper horizontally extending retractable closure plate spaced above said lower plate in said conduit, the lower end of said sub wall being disposed adjacent said upper closure plate, said upper closure plate having a downwardly beveled forward edge, said upper plate and said lower plate being movable between an extended position wherein the conduit is closed and a retracted position wherein the conduit is open, first lever means for reciprocating said upper closure plate between its retracted position and its extended position, second lever means for reciprocating said lower closure plate between its retracted position and its extended position, cam means connected to said first lever means and to said second lever means and being shaped to reciprocate the upper and lower closure plate in alternately opening and closing relationship, to keep said lower closure plate in its extended position until the upper closure plate reaches its extended position and to keep the upper closure plate in its extended position until the lower plate reaches its extended position, means connected to said cam means and to said tray moving means for operating the cam means in timed relationship with the movement of the trays so that the lower plate remains in its extended position until one of the trays is below the conduit, a section of the side wall of said conduit between said upper and lower plates parallelling the lengths of spaghetti being horizontally adjustable relative to the opposite side wall whereby the volume defined by the conduit between the upper and lower plates is adjustable, vibrating means connected to said sub wall for settling the spaghetti in said hopper and said conduit, an upwardly extending wall disposed transversely of the path of movement of the upper closure plate for dividing said part into two regions disposed successively along the path of movement of the upper closure plate, the lower edge of said dividing wall being spaced above said upper plate, said wall being positioned within the hopper so that lengths of spaghetti being delivered to said part by said delivering means do not enter the region of the hopper closer to the forward edge of the upper closure plate when said upper closure plate is in its extended position, whereby said part is set aside for receiving the lengths of spaghetti displaced by said upper plate moving from its retracted position to its extended position while said lower plate is in its extended position.

References Cited in the file of this patent

UNITED STATES PATENTS

| | | |
|---|---|---|
| 134,928 | Price et al. | Jan. 14, 1873 |
| 346,718 | Capewell | Aug. 3, 1886 |
| 547,848 | Davis | Oct. 15, 1895 |
| 616,316 | Haddox | Dec. 20, 1898 |
| 807,484 | Moss | Dec. 19, 1905 |
| 1,270,937 | Gibbons | July 2, 1918 |
| 1,337,440 | Clappison | Apr. 20, 1920 |
| 1,769,285 | Burns | July 1, 1930 |
| 1,969,091 | Miles | Aug. 7, 1934 |
| 2,004,500 | Brunelle | June 11, 1935 |
| 2,111,915 | MacMillin | Mar. 22, 1938 |
| 2,382,369 | Smith | Aug. 18, 1945 |
| 2,973,110 | Gentle | Feb. 28, 1961 |
| 3,045,865 | Trotta | July 24, 1962 |

FOREIGN PATENTS

| | | |
|---|---|---|
| 656,317 | Great Britain | Aug. 22, 1951 |